Nov. 27, 1934.  E. C. MAGDEBURGER  1,981,870

ELASTIC POWER TRANSMITTING DEVICE

Filed May 16, 1933

INVENTOR
*Edward C. Magdeburger*
BY
*Robert A. Lavender*
ATTORNEY

Patented Nov. 27, 1934

1,981,870

UNITED STATES PATENT OFFICE 1,981,870

ELASTIC POWER TRANSMITTING DEVICE

Edward C. Magdeburger, Washington, D. C.

Application May 16, 1933, Serial No. 671,372

11 Claims. (Cl. 309—6)

(Granted under the act of March 3, 1883, as amended April 30, 1928; 370 O. G. 757)

This invention relates to means for transmitting from a piston or other reciprocating power element at least a portion of the energy directly to the connecting rod or other coacting member without the intermediacy of the wristpin or the like.

It is the object of this invention to provide means that will offer greater bearing surfaces for transmitting power from a piston to a connecting rod than can be conveniently formed on a wristpin and thereby to reduce the rate of wear of the wristpin and to facilitate lubrication thereof.

With the above and other objects in view, the invention consists of the construction, combination and arrangement of parts as will be described more fully hereinafter.

Satisfactory functioning of crosshead or wristpin bearings in single acting internal combustion engines is a very serious problem and especially in Diesel engines of the type used in submarines, where their high speed precludes undue increase in the weight of the reciprocating parts. This trouble is easily explained by the fact that it is exceedingly difficult to maintain a lubricating oil film while pin pressures remain continuously in the same direction, as is the case in the single-acting two-cycle Diesel engine. One of the means heretofore proposed was to force the oil into the bearing under very high pressure, but this has not proved satisfactory and, furthermore, requires additional mechanism to effect that result. The solution offered by the present invention is to increase the bearing surface and thereby reduce the pressure per unit area and also to change the direction of application of the forces on the pin during a part of each cycle.

Figure 1:
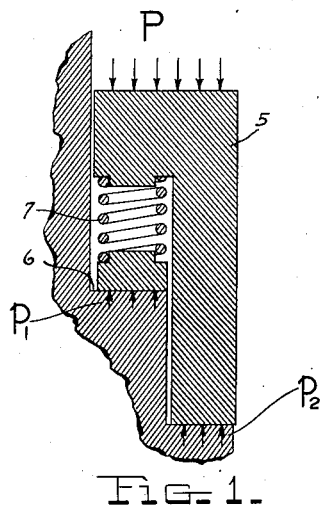
Fig. 1 is a schematic drawing showing the distribution of pressure on the coacting parts as effected by my invention.

In Fig. 1 the total pressure acting upon a piston or like member 5 is represented by P. Under the usual practice this is all applied to the wristpin, whereas in the practice of my invention a portion $P_2$ thereof is transmitted to the wristpin and the remainder $P_1$ acts through resilient member 7 upon an additional surface 6 that is in operative connection with the pin. This construction makes it feasible to apply my invention to already existing structures without material alteration thereof.

Figure 2:
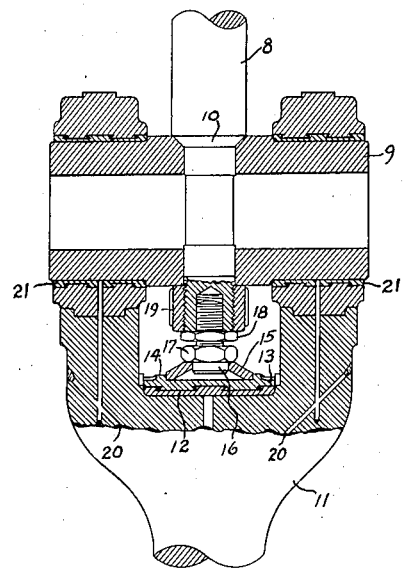
Fig. 2 is a cross-sectional view of a crosshead pin to which my invention is applied.

Piston rod 8 (Fig. 2) passes through crosshead pin 9 and is formed with a frusto-conical shoulder 10 that bears against a like-shaped surface on pin 9. Connecting rod 11, in which pin 9 is journalled, carries a curved bearing member 12 upon which slides a shoe 13 having a circular shoulder 14 within which is seated a dished elastic washer 15 in alignment with the axis of piston rod 8. This spring washer may be designed to support any part of the total load, for instance, about 75 pounds per square inch of piston area with a deflection of only 0.005 inch. A cap screw 16 is threaded into the end of piston rod 8 and its head 17 passes through a central aperture in washer 15, providing a bearing shoulder for the inner portion of washer 15 and nut 18 serving as a lock nut to secure cap screw 16 in place. Nut 19 secures the piston rod in place in the pin 9. The clearance between pin 9 and its bearings is sufficient to permit piston rod 8 to deflect washer 15 the distance mentioned before pin 9 makes driving contact with its bearing, and hence a considerable portion of the thrust is transmitted directly to connecting rod 11 without the bearings of pin 9 being subjected thereto. As soon as the force acting upon the piston drops below 75 pounds per square inch of its area, the elastic washer 15 acts to reverse the direction of the pressure of pin 9 against its bearings and so permits flow of oil through ducts 20 into pin bearings 21. It will be noted that the application of part of the load directly to connecting rod 11 through washer 15 and shoe 13 very materially increases the bearing surface without enlarging the size of the pin 9 or adding materially to the weight of the reciprocating members.

Figure 3:
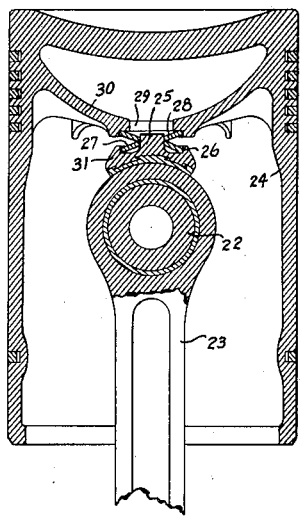
Fig. 3 is a sectional view of a piston, transversely of the wristpin, employing my invention.
Figure 4:
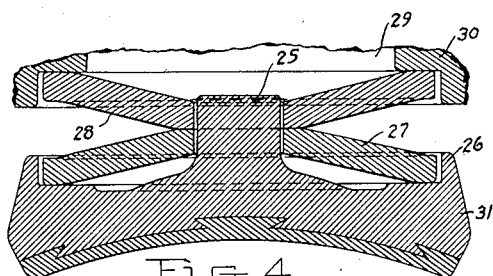
Fig. 4 is an enlarged detail view of one form of resilient element that may be used, being the one shown in Fig. 3.

Fig. 3 shows an application of the present invention to a well known trunk type of piston and connecting rod. Wristpin 22 is journalled in connecting rod 23 and is engaged with piston 24 in the usual manner, the outer surface of the end of the connecting rod being finished smooth and having seated thereon a shoe 31 with a central boss 25 and a shoulder 26. Elastic washers 27 and 28 are dished, the former having its edge seated within shoulder 26, the boss 25 extending through the central aperture therein and the latter is reversed with its edge seated in a rabbet formed in the dished web 30 with the boss 25 passing through its central aperture. In the enlarged detail view shown in Fig. 4 it is seen that elastic washers 27 and 28 are normally of less diameter than the seats in which they are confined to allow for increase of the diameter of the washers when they are deflected. Thus all loads up to the maximum for which the washers are designed will be transmitted through the washers directly to the connecting rod, and of any larger loads an amount equal to that maximum will be so carried, the wristpin bearings being to that extent relieved. As described in connection with Fig. 2, as soon as the total force on the piston drops below the maximum load that the washers carry, the pin will be lifted off the lower surface of the bearing and even moderate oil pressures will be sufficient to lubricate the bearing.

It will be understood that the above description and accompanying drawing comprehend only the general and preferred embodiment of my invention and that various changes may be made therein within the scope of the appended claims, without sacrificing any of the advantages of this invention.

The invention herein described may be manufactured and used by or for the Government of the United States of America for governmental purposes without the payment of any royalty thereon.

I claim:

1. In a device of the class described, a piston rod, a crosshead pin connected thereto, a connecting rod in which said pin is journalled with clearance, a curved bearing surface on said connecting rod, a shoe disposed upon said surface, an elastic washer carried by said shoe adapted to be deflected to an extent equal to the clearance of said pin in its bearings, and means carried by said piston rod disposed to bear against said washer whereby a portion of the thrust of said piston rod is transmitted to said connecting rod through said washer.

2. In a device of the class described, a piston, a wrist-pin carried thereby, a connecting rod in which said pin is journalled, a centrally apertured web in said piston, there being a rabbet formed at the outer edge of the aperture therein, a shoe seated on the end of said connecting rod, said shoe having a central boss and a flange therearound and spaced therefrom, a dished centrally apertured elastic washer seated within said flange and having the said boss disposed in the aperture therein, and an oppositely disposed dished centrally apertured washer disposed with its edge in said rabbet and with the said boss extending through the aperture therein.

3. In a device of the class described, a piston, a wrist-pin carried thereby, a connecting rod in which said pin is journalled, a shoe seated on the end of said connecting rod, a central boss on said shoe and a flange thereon spaced from said boss, a dished elastic washer disposed within said flange and around said boss, and an oppositely dished elastic washer disposed around said boss and operatively related to said piston to receive thrust therefrom.

4. In a device of the class described, a connecting rod having a curved exterior bearing surface, a shoe seated on said surface, a flange on said shoe, a dished elastic washer seated within said flange, a pin journalled in said connecting rod, a piston rod connected to said pin, and means carried by said piston rod whereby thrust is transmitted from said piston rod to said connecting rod through said washer.

5. In a device of the class described, a piston rod, a connecting rod, a pin connecting said piston rod and said connecting rod having clearance in its bearings, and deformable elastic means operatively disposed between said connecting rod and said piston rod whereby thrust is transmitted from said piston rod to said connecting rod.

6. In a device of the class described, a piston, a connecting rod operatively connected to said piston with freedom for limited longitudinal relative movement with respect thereto, and two oppositely turned dished elastic washers disposed between said piston and said connecting rod with the inner peripheries of the washers in contact with each other and the outer edges of the washers acting respectively upon the piston and upon the connecting rod, the said washers acting to move the piston and the connecting rod in opposite directions when the piston is not loaded whereby thrust is transmitted from said piston directly and immediately to said connecting rod through said washers.

7. In a device of the class described, a piston, a connecting rod, a wrist pin connecting the piston and the connecting rod and means exclusive of the wrist pin for transmitting stresses from the piston to the connecting rod, said means including a dished elastic washer.

8. In a device of the class described, a piston, a connecting rod, a wrist pin connecting the piston and the connecting rod, and means exclusive of the wrist pin for transmitting stresses from the piston to the connecting rod, said means including a deformable annular member.

9. In a device of the class described, two reciprocable power transmitting members, a pin forming a hinge connection therebetween, said pin having clearance in at least one bearing, and a deformable elastic washer between said members disposed to transmit thrust from one of said members directly and immediately to the other to the extent required to deform said washer through a distance equal to said clearance.

10. In a device of the class described, two reciprocable power transmitting members, a pin forming a hinge connection therebetween, said pin having clearance in its bearings in at least one of said members, and a deformable elastic washer between said members disposed to transmit thrust from one of said members directly and immediately to the other.

11. In a device of the class described, two reciprocable power transmitting members, a pin forming a hinge connection therebetween, said pin having clearance in at least one bearing, and deformable elastic means between said members disposed to transmit thrust from one of said members directly and immediately to the other to the extent required to deform said elastic means through a distance equal to said clearance.

EDWARD C. MAGDEBURGER.